US012785958B2

(12) United States Patent
Singh et al.

(10) Patent No.: US 12,785,958 B2
(45) Date of Patent: Nov. 3, 2026

(54) SYSTEM AND METHOD FOR MANAGING VERIFIABLE CRYPTOGRAPHIC KEYS ON END USER DEVICES USING A COHORT OF TRUST

(71) Applicant: THALES DIS CPL USA, INC., Austin, TX (US)

(72) Inventors: Ramandeep Singh, Agra (IN); Sumit Sharma, Ghaziabad (IN); HongQian Karen Lu, Austin, TX (US)

(73) Assignee: THALES DIS CPL USA, Inc., Austin, TX (US)

( * ) Notice: Subject to any disclaimer, the term of this patent is extended or adjusted under 35 U.S.C. 154(b) by 113 days.

(21) Appl. No.: 18/888,487

(22) Filed: Sep. 18, 2024

(65) Prior Publication Data

US 2026/0081775 A1 Mar. 19, 2026

(51) Int. Cl.

| | |
|---|---|
| ***H04L 9/14*** | (2006.01) |
| *H04L 9/08* | (2006.01) |
| *H04L 9/32* | (2006.01) |
| *H04L 9/40* | (2022.01) |

(52) U.S. Cl.

CPC .................. *H04L 9/14* (2013.01); *H04L 9/08* (2013.01); *H04L 9/0822* (2013.01); *H04L 9/0838* (2013.01); *H04L 9/0861* (2013.01); *H04L 9/088* (2013.01); *H04L 9/0894* (2013.01); *H04L 9/32* (2013.01); *H04L 63/062* (2013.01)

(58) Field of Classification Search

CPC . H04L 9/08; H04L 9/14; H04L 9/0822; H04L 9/0838; H04L 9/0861; H04L 9/088; H04L 9/0894; H04L 9/32; H04L 63/062

See application file for complete search history.

(56) References Cited

U.S. PATENT DOCUMENTS

| | | | | |
|---|---|---|---|---|
| 11,563,567 | B2 * | 1/2023 | Le Saint | H04L 9/0897 |
| 2010/0235638 | A1 * | 9/2010 | Irvine | H04W 12/0431 380/278 |
| 2021/0135855 | A1 * | 5/2021 | Sunkavally | H04L 9/0825 |
| 2021/0194677 | A1 * | 6/2021 | Pourzandi | H04L 9/0822 |
| 2023/0259276 | A1 * | 8/2023 | Adler | G06F 3/0683 713/176 |

OTHER PUBLICATIONS

"What is Shamir's Secret Sharing?"—Abla, Ledger Academy, Oct. 24, 2023 https://www.ledger.com/academy/topics/security/shamirs-secret-sharing (Year: 2023).*

(Continued)

*Primary Examiner* — Randy A Scott

(57) ABSTRACT

A system or method for protecting personal data at cloud services in a computing environment having one or more processors and memory operatively coupled to the one or more processors with computer instructions cause the one or more processors to perform certain operations including creating a cohort of trust among a plurality of user devices where each user device controls a share of a cryptographic key, managing the cryptographic key using the cohort of trust, verifying the integrity of the cryptographic key before using the cryptographic key for cryptographic operation, and verifying authenticity of members in the cohort of trust.

14 Claims, 6 Drawing Sheets

(56) References Cited

OTHER PUBLICATIONS

"Distributed Security: Shamir's Secret Sharing Key Shares"—Charles McFarland, Trellix, Aug. 2022 https://www.trellix.com/assets/docs/atr-library/tr-shamirs-secret-sharing-key-shares.pdf (Year: 2022).*

International Search Report (PCT/ISA/210) and Written Opinion (PCT/ISA/237) mailed on Nov. 28, 2025 by the European Patent Office as the International Searching Authority for current International Application No. PCTUS202545436—[17 pages].

Gennaro Rosario et al: "Secure Distributed Key Generation for Discrete-Log Based Cryptosystems", Journal of Cryptology, Springer US, NY, vol. 20, No. 1, May 24, 2006 (May 24, 2006), pp. 51-83, XP037087850, ISSN: 0933-2790, DOI:10.1007/S00145.006.0347·3 [retrieved on May 24, 2006] abstract; Section 1; section 4,2; Section 5.2.

* cited by examiner

100

200

User Registration and Registration of Cohort of Trust (CoT) members

400

Key Reconstruction

SYSTEM AND METHOD FOR MANAGING VERIFIABLE CRYPTOGRAPHIC KEYS ON END USER DEVICES USING A COHORT OF TRUST

TECHNICAL FIELD

The present embodiments relate generally to systems and methods of managing the verification of cryptographic keys to end users including key generation and key recovery. More particularly, the system and method relate to managing verifiable cryptographic keys on end user devices using a cohort of trust (CoT).

BACKGROUND

In many systems, a key must be processed before it can be useful. For example, a public/private keypair must be processed before it can be used in Secure Socket Layer (SSL) or Transport Layer Security (TLS) communications. After a requestor generates the public/private keypair, the requestor then creates a certificate signing request that ties the public portion of the keypair to an identity such that a Certificate Authority is satisfied. The Certificate Authority, when satisfied with the identity of the requestor, sends back an identity certificate that has been signed by the Certificate Authority. The keypair and certificate are then installed on a system to service secure communication for the requestor. After installation, the keypair and certificate are ready for use and may be considered active.

Most Cloud Service Providers (CSPs) are sole custodians of end-users' cryptographic keys which are used to perform various cryptographic operations on end-users' private data.

End-users don't have any control on the management, storage and life cycle of these keys. There is a dire need to extend HYOK (Hold your own key) technology presently applicable only for enterprise use-cases to end-users.

For example, though CSPs are taking due diligence for protecting the end-user keys, data breaches instances for CSPs continue to occur from time to time. As more and more personal data is stored on cloud services, end-users have increased concern over their personal data being misused. Users ultimately want better control over their personal data. For a service provider to be compliant with data privacy regulations such as GDPR and other data sovereignty requirements, the service providers need to provide users with better control over their personal data.

Although there are several options to resolve some of the problems raised, none provide a practical solution from an end user's perspective until now.

Existing systems that use a key that is managed at the Cloud Service Provider (CSP's) end can provide the security desired, but also creates a potential widespread vulnerability due to the centralized nature of having such management at the CSP. Another alternative such as using a Key Management Service (KMS) hosted at a CSP or at appliances present similar issues. Using a key that is derived from a memorized password although removes the centralized threat still presents another risk that the user forgets the password during a backup or restore and thus the key cannot be generated using this memorized password.

In yet other existing alternatives using a secrets management platform implementation, a customer share (of a key) is stored in an enterprise environment and not for end user devices. In such a system, the platform may require every share of the key in order to decrypt which may be impractical in large or very large enterprise environments. There is no cohort of trust including user devices in such systems. Such systems also fail to include verifiable authenticity of cohort of trust devices and integrity of shares.

All of the subject matter discussed in this Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

In some embodiments, the systems and methods herein use a secret sharing algorithm such as Shamir's secret sharing (SSS) that distributes private sharing information ("the secret") among a group. The secret cannot be revealed unless a quorum of the group acts together to pool their knowledge. To achieve this, the secret is mathematically divided into parts (the "shares") from which the secret can be reassembled only when a sufficient number of shares are combined.

Polynomials work for secret sharing because you can give people some of the points on the curve without revealing to them the actual polynomial formula. This means you can share points, but someone can only find the polynomial if they have enough points. These points are the 'shares' of the secret.

Thus, the solution in some embodiments uses a verifiable management of cryptographic keys that extends Hold your own key (HYOK) capabilities to the end users' devices.

In some embodiments, the system consists of a Cohort of Trust (CoT), a client-side app (CoT App), and a CoT manager that manages the CoT and its information and configuration. The CoT members can be user's mobile devices or Cloud Service Providers (CSPs) or a combination of both. The embodiments can use an existing secret sharing method or newly developed sharing methods that reconstruct the key from shares stored on a portion of the CoT members' devices (user mobile devices and/or CSPs).

Note that this arrangement and method is different from existing products or services that use secret sharing, where in general the key generator is the same as the key constructor. With this feature herein, even if the original user device that created the key is lost or stolen, other devices can still reconstruct the key. The key reconstruction can be achieved only on member devices but not on CSP. The system design prevents the key reconstruction on the CSP to avoid the issue of having a centralized reconstructed key that creates a great vulnerability.

In some embodiments, a system for protecting personal data at cloud services can include one or more processors (604) and memory (602) operatively coupled to the one or more processors, where the memory includes computer instructions which when executed by the one or more processors causes the one or more processors to perform certain operations. The operations can include creating a cohort of trust among a plurality of user devices where each user device controls a share of a cryptographic key, managing the cryptographic key using the cohort of trust, verifying the integrity of the cryptographic key before using the cryptographic key for cryptographic operation, and proving an authenticity of a user device to a remaining set of user devices in the cohort of trust.

In some embodiments, an application on each of the plurality of user devices manages the cryptographic keys.

In some embodiments, the one or more processors are further configured to remove a member of the cohort of trust when a user device is lost or being replaced.

In some embodiments, the one or more processors are further configured to remove a member of the cohort of trust when the member no longer wants to use the cloud services.

In some embodiments, the one or more processors are further configured to remove a member of the cohort of trust when a user device is lost or being replaced or when a member of the cohort of trust no longer wants to use the cloud service.

In some embodiments, the cohort of trust is further created among the plurality of user devices and one or more cloud service providers where each user device and each cloud service provider control a share of the cryptographic key. In some embodiments, the one or more processors are further configured to prove an authenticity of a user device to a remaining set of user devices and a remaining set of cloud services providers in the cohort of trust.

In some embodiments, a system for protecting personal data at cloud services and managing verifiable cryptographic keys on end user devices can include a cohort of trust manager that manages a cohort of trust and its information and configuration where the cohort of trust comprises members including one or more among a plurality of end user devices or cloud service providers, a client-side application on each of the end user devices in the plurality of end user devices, and a secret sharing algorithm for distributing private information among the members of the cohort of trust to reconstruct a cryptographic key from shares stored on the end user devices of the members of the cohort of trust, wherein n of m devices among the members must provide their shares to reconstruct the cryptographic key.

In some embodiments, n is less than m. In some embodiments, n can also equal to m. In some embodiments, the reconstruction of the cryptographic key can only be done on one of the end user devices of the cohort of trust.

In some embodiments, the cohort of trust comprises members including one or more among a plurality of end user devices and the cloud service providers.

In some embodiments, a method for protecting personal data at cloud services in a computing environment having one or more processors and memory operatively coupled to the one or more processors, where the memory includes computer instructions which when executed by the one or more processors causes the one or more processors to perform certain operations. In some embodiments, the operations include creating a cohort of trust among a plurality of user devices where each user device controls a share among shares of a cryptographic key, managing the cryptographic key using the cohort of trust, verifying the integrity of the shares before constructing the cryptographic key and using the cryptographic key for cryptographic operation, and verifying authenticity of members in the cohort of trust.

In some embodiments, the one or more processors are further configured to remove a member of the cohort of trust when a user device is lost or being replaced and further configured to remove a member of the cohort of trust when the member no longer wants to use the cloud services.

In some embodiments, the cohort of trust is further created among the plurality of user devices and one or more cloud service providers where each user device and each cloud service provider control a share of the cryptographic key and wherein the one or more processors are further configured to prove an authenticity of a user device to a remaining set of user devices and a remaining set of cloud services providers in the cohort of trust.

In some embodiments, the one or more processors are further configured to use a secret sharing algorithm to reconstruct the cryptographic key from shares on user devices from the cohort of trust.

BRIEF DESCRIPTION OF THE DRAWINGS

The accompanying drawings, which are incorporated in and constitute a part of this description, illustrate embodiments consistent with the embodiments and, together with the description, serve to explain the principles of the embodiments.

Specific embodiments have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments. Instead, they are merely examples of systems, apparatuses and methods consistent with aspects related to the embodiments as recited in the appended claims.

Figure 1:
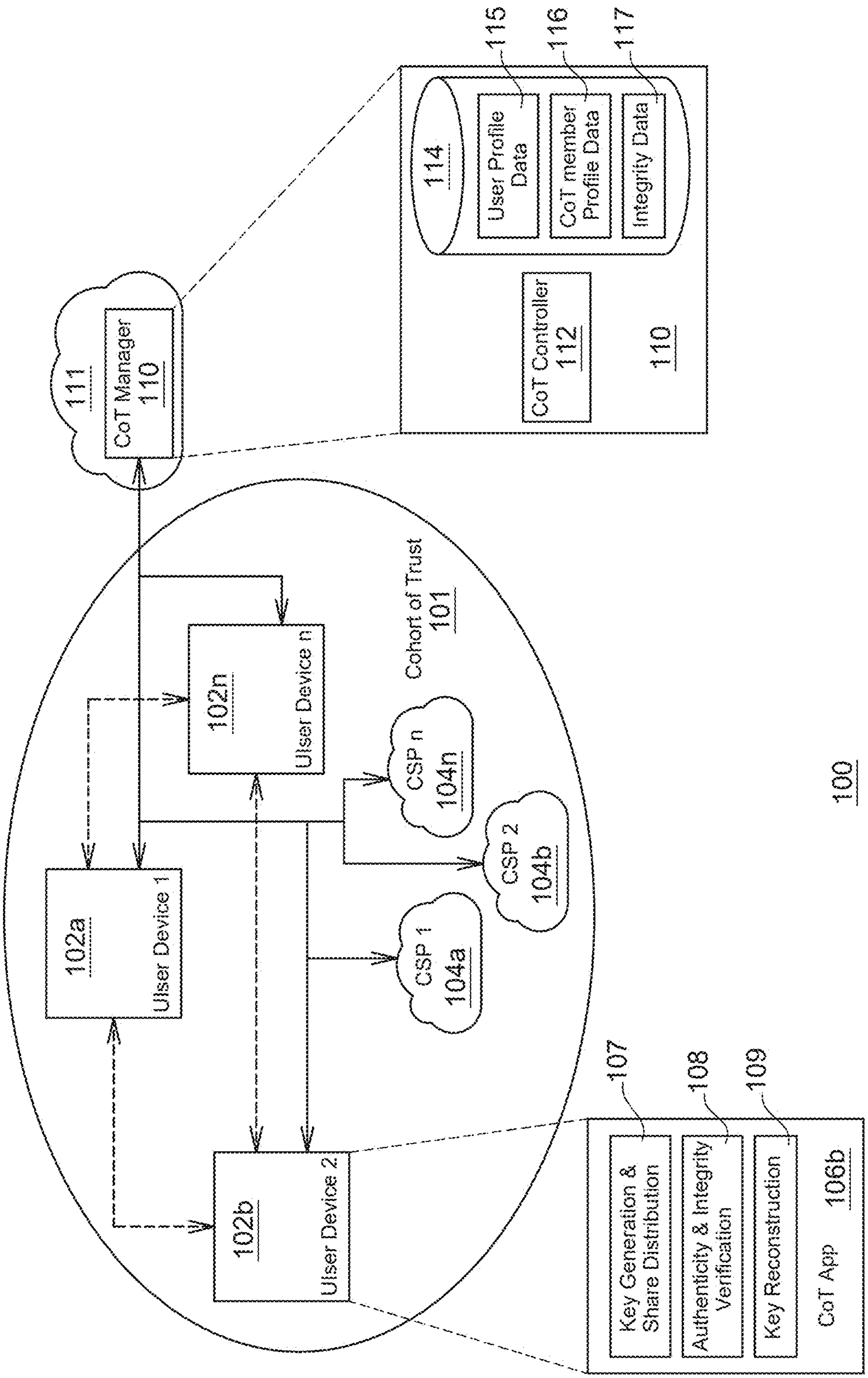
FIG. 1 illustrates a block diagram of a system for managing verifiable cryptographic keys in end user devices using a cohort of trust in accordance with the embodiments.

Referring to FIG. 1, a high level architecture illustrates a system 100 for protecting personal data at cloud services (111, 104*a*, 104*b*, or 104*n*) and managing verifiable cryptographic keys on end user devices (102*a*, 102*b*, 102*n*) can include a cohort of trust manager 110 that manages a cohort of trust 101 and its information and configuration where the cohort of trust 101 comprises members including one or more among a plurality of end user devices (102*a*, 102*b*, 102*n*) or cloud service providers (104*a*, 104*b*, or 104*n*), a client-side or CoT application 106 on each of the end user devices in the plurality of end user devices, and a key generation and share distribution or secret sharing algorithm 107 for distributing private information among the members of the cohort of trust to reconstruct a cryptographic key from shares stored on the end user devices of the members of the cohort of trust, wherein n of m devices among the members must provide their shares to reconstruct the cryptographic key. In some embodiments, n is less than m. The CoT application 106, besides the key generation and share distribution algorithm 107, can further include an authenticity and integrity verification algorithm 108, and a key reconstruction algorithm 109.

In some embodiments, the CoT manager 110 can include a CoT Controller 112 and a storage or database 114 that can include user profile data 115, CoT member profile data 116 and integrity data 117.

In some embodiments, the reconstruction of the cryptographic key can only be done on one of the end user devices of the cohort of trust.

In some embodiments, the cohort of trust including members including one or more among a plurality of end user devices and the cloud service providers.

Figure 2:
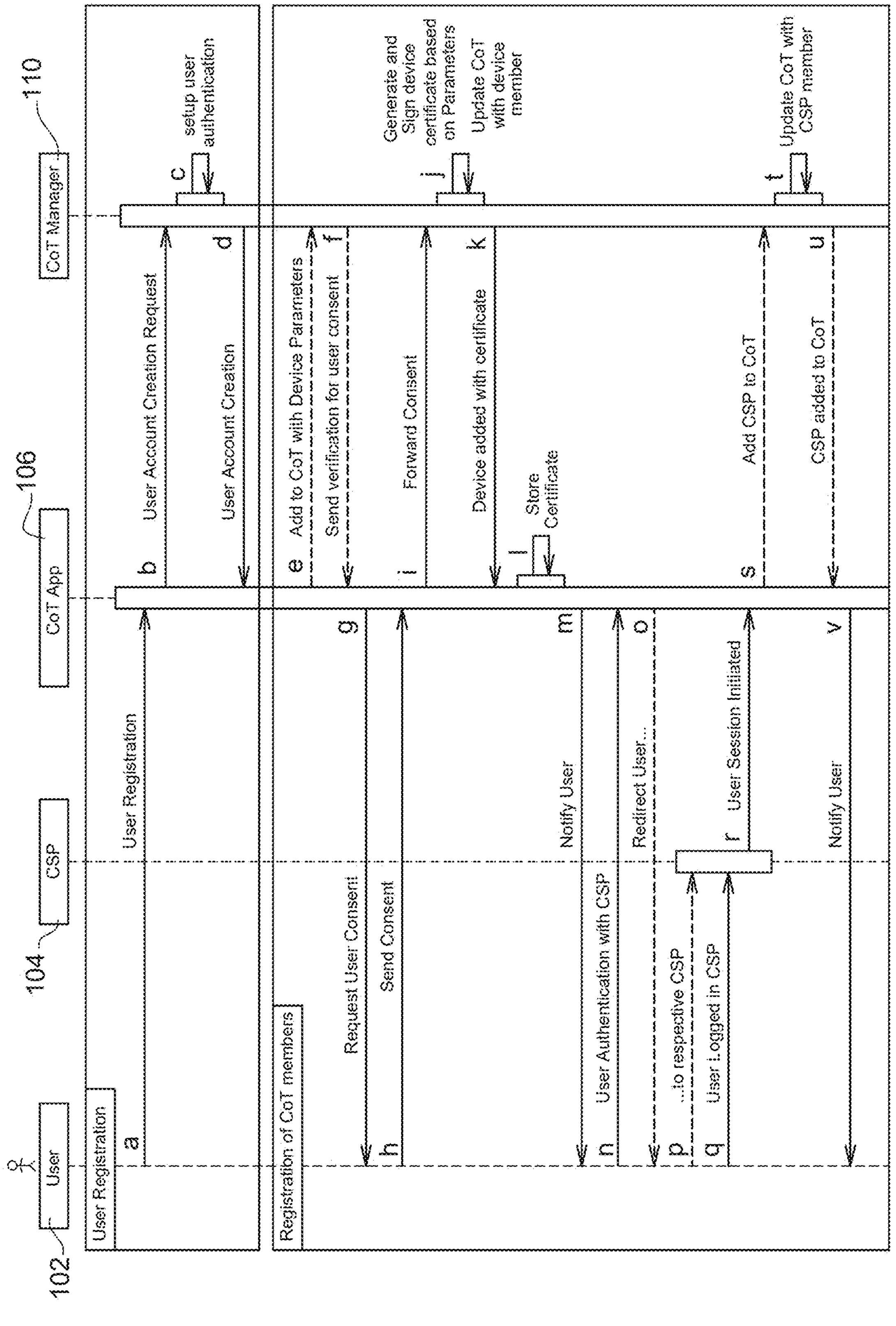
FIG. 2 illustrates a system flow diagram for user registration and registration of CoT members in accordance with the embodiments.

To start, as illustrated in the flow diagram 200 of FIG. 2, a user 102 registers with a CoT manager 110, where the Cot manager 110 may be an online component. The user 102 then installs a CoT application or app 106 on their devices and register these devices to the CoT manager 110. Using the CoT manager 110, the user 102, creates a Cohort of Trust (CoT) (see 101 in FIG. 1) from different user devices 102 and CSPs 104 that they use.

The CoT App 106 on a user's device 102 can generate a cryptographic key or a secret for the user, which will be used to protect personal data. The CoT 101 does not store the key. Instead, the CoT 101 uses Verifiable Secret Sharing or a VSS mechanism for members of the CoT to keep shares of the key. A user's CoT device can reconstruct the key from several shares when needed.

Referring again to FIG. 2, at Step a, a User 102 creates an account at the CoT manager 110 with a user account creation request at Step b to setup strong authentication at Step c whereupon the user account is created at step d.

Once app is installed on an end-user's device, the user will login with their account on the CoT app.

The CoT manager generates a certificate based on the device parameters sent by the device and cryptographically signs it. It then sends the certificate back to the CoT app. The certificate will be used to verify the authenticity of the device's CoT membership.

The user 102 creates a member in the CoT for the device at the CoT manager 110.

The user can add subsequent devices and CSPs in their Cohort of Trust.

List of popular end-user CSPs are already listed on CoT app. For adding a CSP to the CoT, the user needs to login to that CSP on CoT app using any device in the CoT.

The communication between the devices can be done through WiFi, Bluetooth, or other wireless formats for example.

In some embodiments, actual registration process of CoT members can include a step e of requesting the CoT manager 110 to add to the CoT with device parameters. At step f, the CoT manager 110 sends a verification request to the CoT App 106 for user consent which is forwarded to the user 102 at Step g. At Step h, the user's consent is sent to the CoT app 106 and at Step i, the CoT app 106 forwards such consent to the CoT manager 110. At step j, the CoT manager 110 generates and signs the device certificate based on parameters and updates the CoT with the device member. At step k, the device is added with the certificate and the certificate is stored at the CoT App 106 with step l. At step m, the user 102 is notified of the addition to the CoT. At step n, user authentication is performed with the CSP whereupon the User is redirected at step o and the user is then directed to the respective CSP 104 at step p. (Note that step n starts a separate registration of a CSP as a CoT member. Previous steps register a user device as a CoT member.) Then, the new user is logged in the CSP 104 at step q and a user session between the CSP and the CoT App is initiated at step r via the CoT App 106. Further, the CSP is added to the CoT at step s via the CoT manager 110 whereupon the CoT manager 110 updates the CoT with the CSP member. At step u, the CoT App 106 is provided with information regarding the CSP being added to the CoT and the CoT App 106 subsequently notifies the user 102 at step v.

Figure 3:
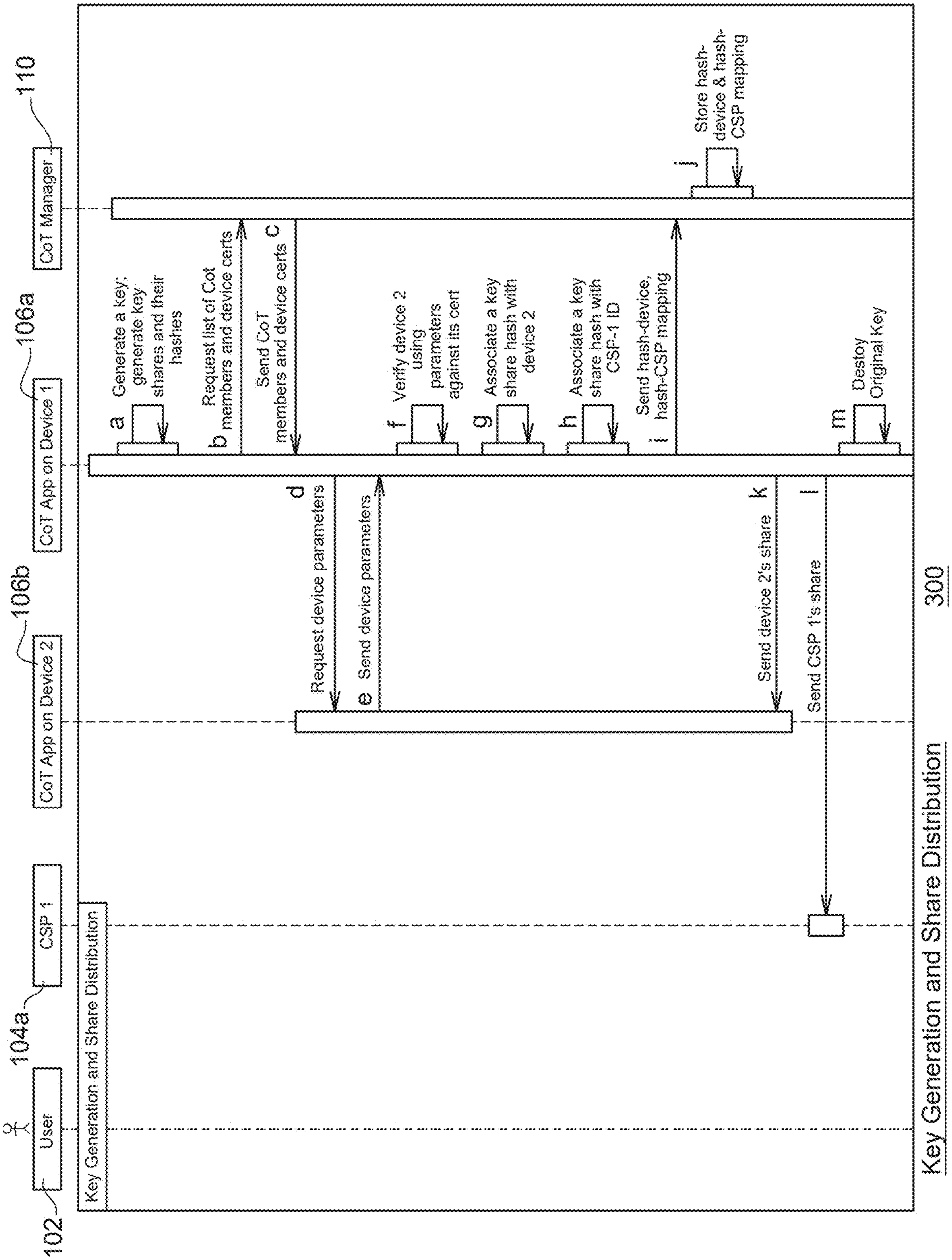
FIG. 3 illustrates a system flow diagram for key generation and share distribution in accordance with the embodiments.

Referring to FIG. 3, a flow diagram 300 of FIG. 3 illustrates a key generation and share distribution process. The CoT app on a user device generates a cryptographic key but does not persist it. Using an existing secret sharing mechanism, the app 106*a*, for example, generates shares that can be used to reconstruct the key and distributes the shares to the CoT members.

The CoT app in a CoT device member generates a cryptographic key, for example, for data encryption. More specifically, the CoT app 106*a* on Device 1 generates a key having 'n' shares (from the key) using any distributed secret sharing scheme, and computes hashes for each share at Step a. The scheme defines a threshold 'm', which is the minimum number of secret shares needed to reconstruct the key. At Step b, the CoT app 106*a* sends a request to the CoT manager 110 to get the list of CoT members and their membership/device certificates. At step c, the CoT manager 110 sends the list of CoT members and their certificates to the CoT app 106*a*. At steps d and e, the CoT App 106*a* connects to CoT members (106*b*, etc.) and requests their device parameters (for device members).

At Step f, the system or CoT app 106*a* verifies device members' authenticity using the certificates and received device parameters. Once verified, the CoT app 106*a* associates a share's cryptographic hash with a device 106*b* at Step g or with CSP id 104*a* at Step h and sends at Step i the hashes and the mapping to the CoT manager 110. At step j, the CoT manager 110 stores the hash-device and hash-CSP mapping. The CoT App 106*a* sends shares according to the mapping to members of CoT-CSPs or CoT app installed on user devices or any combination of both, which the user has access to, for storage. In particular, step k has the CoT App 106*a* sending device 2's share (of the key) to the CoT app 106*b* on device 2. Similarly, at step l, the CoT App 106 sends CSP1's share (of the key) to CSP1 104*a*. The key is used for cryptographic operations, for example, data encryption if there is a need. At Step m, the original key on CoT App 106*a* on device 1 is deleted from memory or otherwise destroyed.

Figure 4:
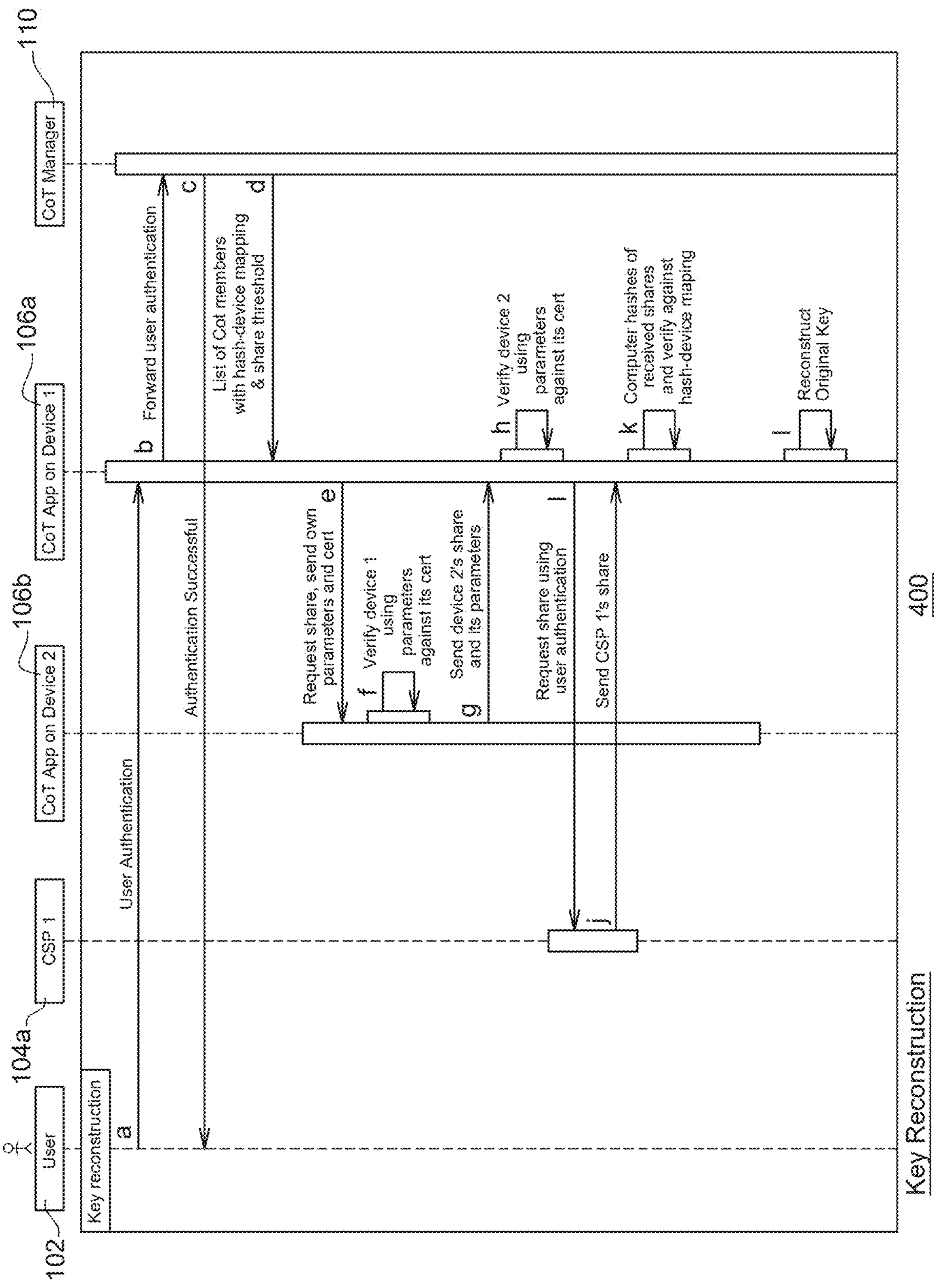
FIG. 4 illustrates a system flow diagram for key reconstruction in accordance with the embodiments.

Referring to FIG. 4, a flow diagram 400 illustrates a key reconstruction process. With the user's permission, any CoT devices of the user can request shares from other CoT members and perform key reconstruction. It is important to verify the requester for shares since the requester can reconstruct the key once getting enough shares. Accordingly, user 102 makes a user authentication request at Step a via the CoT app 106*a*. The CoT app 106*a* forwards the user authentication to the CoT manager at Step b and the user 102 is informed of a successful authentication at Step c.

Once the User logs into the CoT Application (106*a*) on one of their devices and the CoT App on the device connects to a combination of m CSPs/devices from the CoT to request shares, the CoT app 106*a* gets the latest CoT member list containing share hashes to member mapping from the CoT manager at Step d before connecting to other CoT members if it does not have the latest list. For CoT member devices, the CoT App 106*a* of the device 1 sends its device parameters and the CoT device certificate at Step e. Each CoT member devices verify the requesting device 1's certificate by verifying the signature using the device parameters received and the public key associated with the certificate at step f. The CoT app 106*a* on device 1 also verifies other member devices' authenticity by requesting their device parameters and certificate.

Once verified, CoT members (like Device 2 via CoT app 106*b*) can send shares at Step g to CoT App 106*a* at device 1. Otherwise, they do not send the shares. At Step h, the CoT App 106*a* at device 1 can verify device 2 using parameters against its certificate. At Step i, CoT App 106*a* can request a key share from the CSP1 104*a* using user authentication. At step j, CSP1 sends its key share to the CoT app 106*a* on device 1. The CoT app 106*a* on device 1 at step k computes hashes of received shares as well as its own share and verifies the hashes of each share retrieved against those received from CoT Manager 110 in the mapping.

If hash of a share is not matched then CoT application will discard that share and look for another share from CoT. Combining with its own secret share and received n−1 shares from CoT where n is less than or equal to m as designed CoT app 106*a* on device 1 verifies the integrities of the shares. If all good, CoT app 106*a* reconstructs the original key at Step l.

Figure 5:
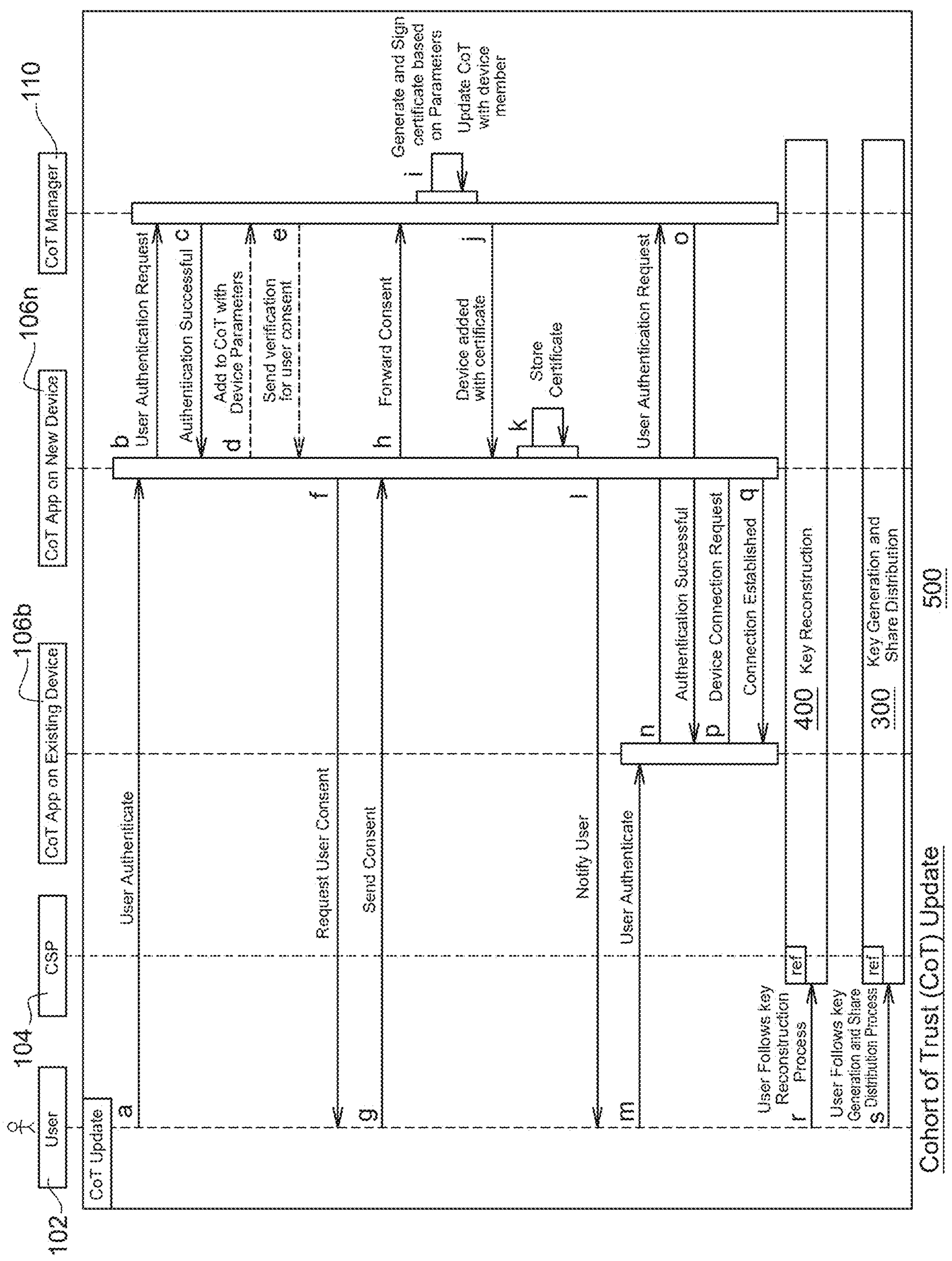
FIG. 5 illustrates a system flow diagram for a CoT update in accordance with the embodiments.

Referring to FIG. 5, a flow diagram 500 illustrates a Cohort of Trust update process. A user 102 (and its corresponding Cot App 106*b*) can add a new device (and its CoT App 106*n*) to the user's CoT at the CoT manager 110. Since the CoT manager 110 cannot reconstruct the key, how does the new device 106*n* get a key share? Only an existing CoT device member (such as 106*b*) can generate another share, but how does the existing device know that it needs to do so and how does it know whom to send the share? The following process addresses these questions.

The user 102 adds a new device as per User Registration and CoT setup process (see Steps a-q). User selects one of his CoT device and logs into the CoT App (106*b*). User connects the existing device with the new device via, e.g. WiFi or Bluetooth. User selects from the App to create and share a new key share with a new CoT device. CoT App 106*b* connects to the CoT manager 110 to check if a new device is added to the CoT, and if so gets the device information and public key of the device.

CoT App 106*b* generates a new key share. For example, if using Shamir's secret sharing, the App collects enough shares from existing CoT members, reconstructs the polynomial, and picks up another point. CoT App 106*b* generates hash for the new share and checks with the CoT manager 110 if the share already exists. If so, picks up another point and repeats the process until the new share is different from existing ones. CoT App 106*b* connects at Step q to the CoT App (106*n*) on the new device, and both devices authenticate to each other and establish a secure channel. CoT App 106*b* sends the key share to CoT App 106*n*. CoT App 106*b* sends notification to the user 102.

As shown in FIG. 5, at step r, the User 102 can follow the key reconstruction process 400 as outlined in FIG. 4. At Step s, the User 102 can also follow the key generation and share distribution process as outlined in FIG. 3.

In some of the embodiments, the solution gives an end user full control of cryptographic keys used to protect their personal data in the Cloud and ensures that the user is in full control of their cloud data.

The proposed embodiments provide a novel way to provide Hold Your Own Key (HYOK) to the end user market. This not only caters to the end user market but also wins the trust of the people storing their personal data on cloud storage.

Figure 6:
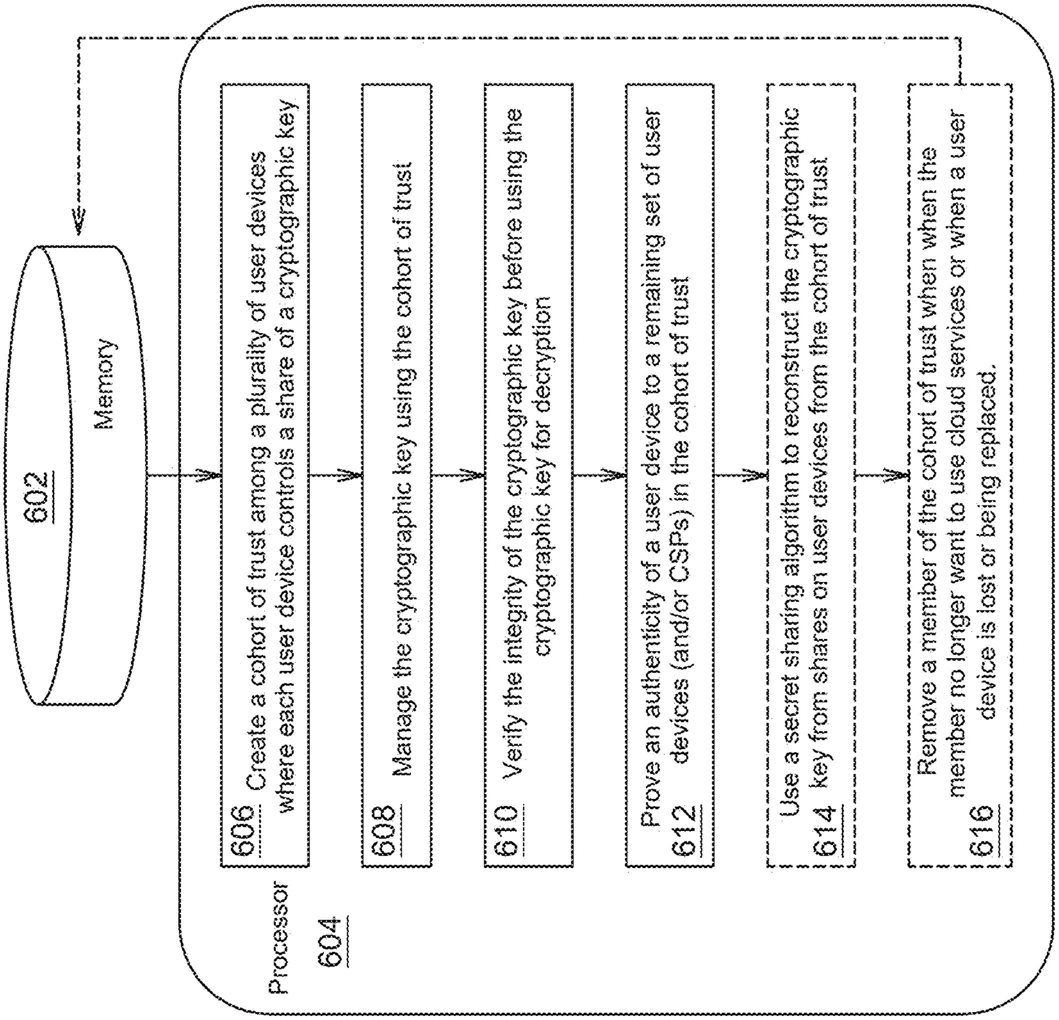
FIG. 6 illustrates a flow chart for a method of managing verifiable cryptographic keys in end user devices using a cohort of trust in accordance with the embodiments.

In some embodiments, with further reference to a method 600 as illustrated in FIG. 6, read and writes from a file in memory 602 can be analyzed by at least one processor 604 in a computing environment having one or more processors and memory operatively coupled to the one or more processors. The one or more processors 604 can perform a method for protecting personal data at cloud services, where the memory includes computer instructions which causes the one or more processors to perform certain operations. In some embodiments, the operations include creating at step 606 a cohort of trust among a plurality of user devices where each user device controls a share among shares of a cryptographic key, managing at step 608 the cryptographic key using the cohort of trust, verifying at step 610 the integrity of the shares before constructing the cryptographic key and using the cryptographic key for cryptographic operations, and verifying at step 612 an authenticity of members in the cohort of trust (or verifying a user device to a remaining set of user devices in the cohort of trust).

In some embodiments, the cohort of trust is further created among the plurality of user devices and one or more cloud service providers where each user device and each cloud service provider control a share of the cryptographic key and where the one or more processors are further configured to prove an authenticity of a user device to a remaining set of user devices and/or a remaining set of cloud services providers in the cohort of trust.

In some embodiments, the one or more processors are further configured to use at step 614 a secret sharing algorithm to reconstruct the cryptographic key from shares on user devices from the cohort of trust.

In some embodiments, the one or more processors are further configured to remove at step 616 a member of the cohort of trust when a user device is lost or being replaced and further configured to remove a member of the cohort of trust when the member no longer wants to use the cloud services.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed, is:

1. A system for protecting personal data at cloud services, comprising:

a Cohort of Trust (CoT) manager configured to manage membership information, device certificates, and integrity information associated with a Cohort of Trust; and a CoT application executed on each of a plurality of user devices forming the Cohort of Trust;

one or more processors and memory coupled to the one or more processors;

wherein the CoT application and the CoT manager are configured by the one or more processors;

wherein the memory includes computer instructions which when executed by the one or more processors causes the one or more processors to perform operations of:

creating a Cohort of Trust among the plurality of user devices where each user device controls a share of a cryptographic key generated using a verifiable secret sharing scheme;

generating, at a first user device, the cryptographic key and a plurality of shares of the cryptographic key using the verifiable secret sharing scheme;

distributing the plurality of shares among members of the Cohort of Trust and deleting the cryptographic key from memory after distribution of the plurality of shares;

obtaining, from the CoT manager, cryptographically signed device certificates associated with members of the Cohort of Trust;

proving authenticity of a requesting user device to a remaining set of user devices in the Cohort of Trust by validating a cryptographically signed device certificate associated with the requesting user device;

responsive to successful validation of the cryptographically signed device certificate, retrieving, from at least N members among M members of the Cohort of Trust, shares associated with the cryptographic key;

obtaining, from the CoT manager, integrity information comprising cryptographic hashes associated with the shares;

verifying integrity of the retrieved shares before using the cryptographic key for performing a cryptographic operation by comparing cryptographic hashes computed from the retrieved shares against the integrity information obtained from the CoT manager; and reconstructing the cryptographic key on a user device of the Cohort of Trust from the retrieved shares thereby enabling cryptographic protection of personal data using a cryptographic keys controlled by members of the Cohort of Trust rather than by a cloud service provider.

2. The system of claim 1, wherein the CoT application on each of the plurality of user devices manages the cryptographic keys, wherein the cryptographic key is reconstructable on a user device other than a user device that originally generated the cryptographic key, and wherein reconstruction of the cryptographic key is performed on a member device of the Cohort of Trust and is not performed by a cloud service provider.

3. The system of claim 1, wherein the one or more processors are further configured to remove a member of the cohort of trust when a user device is lost or being replaced.

4. The system of claim 1, wherein the one or more processors are further configured to remove a member of the cohort of trust when the member no longer wants to use the cloud services.

5. The system of claim 1, wherein the one or more processors are further configured to remove a member of the cohort of trust when a user device is lost or being replaced or when a member of the cohort of trust no longer wants to use the cloud service.

6. The system of claim 1, wherein the one or more processors are further configured to prove an authenticity of a user device to a remaining set of cloud services providers in the cohort of trust.

7. A system for protecting personal data at cloud services and managing verifiable cryptographic keys on end user devices, comprising:

a Cohort of Trust (CoT) manager configured to manage membership information, device certificates, and integrity information associated with a Cohort of Trust among a plurality of end user devices or cloud service providers;

a (CoT) application executed on each of the end user devices in the plurality of end user devices;

one or more processors and memory coupled to the one or more processors;

wherein the CoT application and the CoT manager are configured by the one or more processors;

wherein the memory includes computer instructions which when executed by the one or more processors causes the one or more processors to perform the operations of:

creating a cohort of trust among a plurality of user devices where each user device controls a share of a cryptographic key generated using a verifiable secret sharing algorithm for distributing private information among the members of the cohort of trust to reconstruct a cryptographic key from shares stored on the end user devices of the members of the cohort of trust, wherein n of m devices among the members must provide their shares to reconstruct the cryptographic key, by:

generating, at a first user device, the cryptographic key and a plurality of shares of the cryptographic key using the verifiable secret sharing scheme;

distributing the plurality of shares among members of the Cohort of Trust and deleting the cryptographic key from memory after distribution of the plurality of shares;

obtaining, from the CoT manager, cryptographically signed device certificates associated with members of the Cohort of Trust;

proving authenticity of a requesting user device to a remaining set of user devices in the Cohort of Trust by validating a cryptographically signed device certificate associated with the requesting user device;

responsive to successful validation of the cryptographically signed device certificate, retrieving, from at least n members among m members of the Cohort of Trust, shares associated with the cryptographic key;

obtaining, from the CoT manager, integrity information comprising cryptographic hashes associated with the shares;

verifying integrity of the retrieved shares before performing a cryptographic operation using the cryptographic key by comparing cryptographic hashes computed from the retrieved shares against the integrity information obtained from the CoT manager; and reconstructing the cryptographic key on a user device of the Cohort of Trust from the retrieved shares thereby enabling cryptographic protection of personal data using a cryptographic keys controlled by members of the Cohort of Trust rather than by a cloud service provider.

8. The system of claim 7, wherein N is less than M.

9. The system of claim 7, wherein the reconstruction of the cryptographic key is performed on member devices of the cohort of trust and is not performed by a cloud service provider, wherein the cryptographic key is reconstructable on a user device other than a user device that originally generated the cryptographic key.

10. The system of claim 7, wherein the cohort of trust comprises members including one or more among a plurality of end user devices and the cloud service providers.

11. A method for protecting personal data at cloud services in a computing environment, of a system comprising:

a Cohort of Trust (CoT) manager configured to manage membership information, device certificates, and integrity information associated with a Cohort of Trust; and a CoT application executed on each of a plurality of user devices forming the Cohort of Trust;

one or more processors and memory coupled to the one or more processors;

wherein the CoT application and the CoT manager are configured by the one or more processors;

wherein the memory includes computer instructions which when executed by the one or more processors causes the one or more processors to perform the method steps of:

creating a Cohort of Trust among the plurality of user devices where each user device controls a share of a cryptographic key generated using a verifiable secret sharing scheme;

generating, at a first user device, the cryptographic key and a plurality of shares of the cryptographic key using the verifiable secret sharing scheme;

distributing the plurality of shares among members of the Cohort of Trust and deleting the cryptographic key from memory after distribution of the plurality of shares;

obtaining, from the CoT manager, cryptographically signed device certificates associated with members of the Cohort of Trust;

proving authenticity of a requesting user device to a remaining set of user devices in the Cohort of Trust by validating a cryptographically signed device certificate associated with the requesting user device;

responsive to successful validation of the cryptographically signed device certificate, retrieving, from at least N members among M members of the Cohort of Trust, shares associated with the cryptographic key;

obtaining, from the CoT manager, integrity information comprising cryptographic hashes associated with the shares;

verifying integrity of the retrieved shares before constructing the cryptographic key and using the cryptographic key for a cryptographic operation by comparing cryptographic hashes computed from the retrieved shares against the integrity information obtained from the CoT manager; and reconstructing the cryptographic key on a user device of the Cohort of Trust from the retrieved shares thereby enabling cryptographic protection of personal data using a cryptographic keys controlled by members of the Cohort of Trust rather than by a cloud service provider.

12. The method of claim 11, wherein the one or more processors are further configured to remove a member of the cohort of trust when a user device is lost or being replaced and further configured to remove a member of the cohort of trust when the member no longer wants to use the cloud services.

13. The method of claim 11, wherein the cohort of trust is further created among the plurality of user devices and one or more cloud service providers where each user device and each cloud service provider control a share of the cryptographic key and wherein the one or more processors are further configured to prove an authenticity of a user device to a remaining set of user devices and a remaining set of cloud services providers in the cohort of trust.

14. The method of claim 11, wherein the one or more processors are further configured to use Shamir's secret sharing algorithm as the verifiable secret scheme to reconstruct the cryptographic key from shares on user devices from the cohort of trust.

* * * * *